March 18, 1958   S. T. SEMEGEN ET AL   2,827,098
ARTICLE OF MANUFACTURE AND METHOD
FOR MAKING THE SAME
Filed Oct. 22, 1954
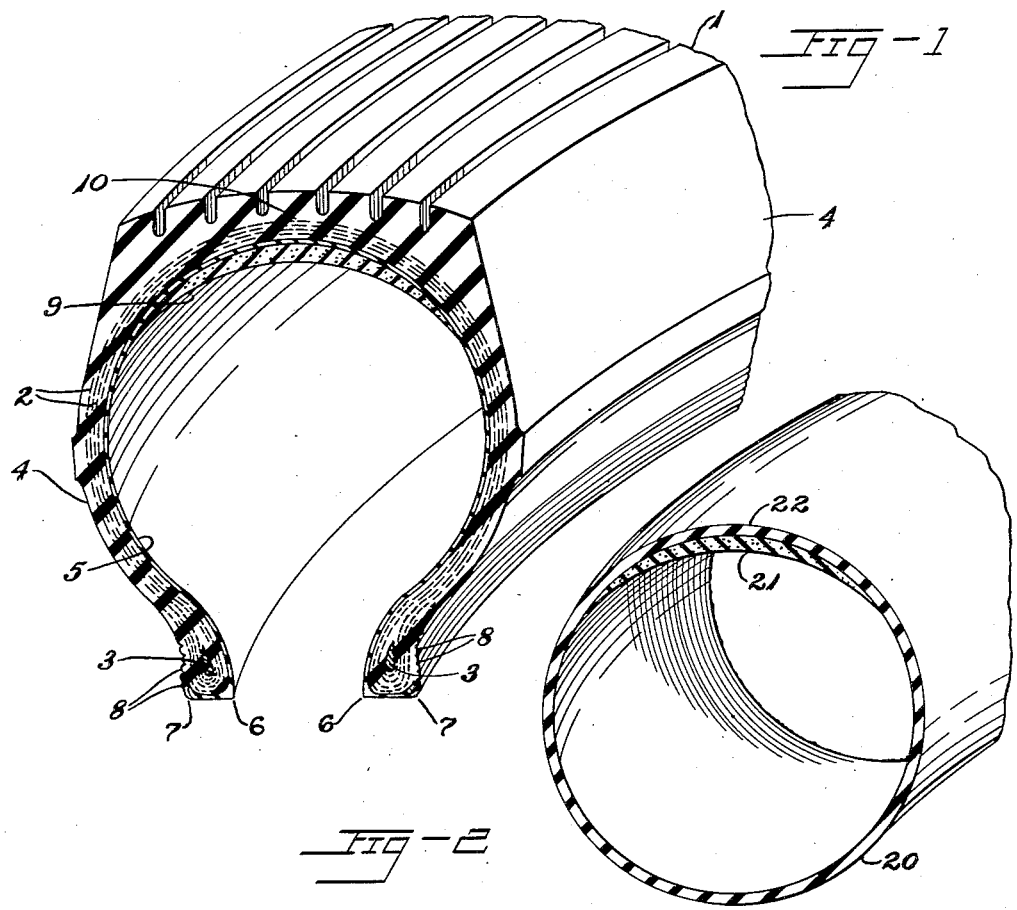
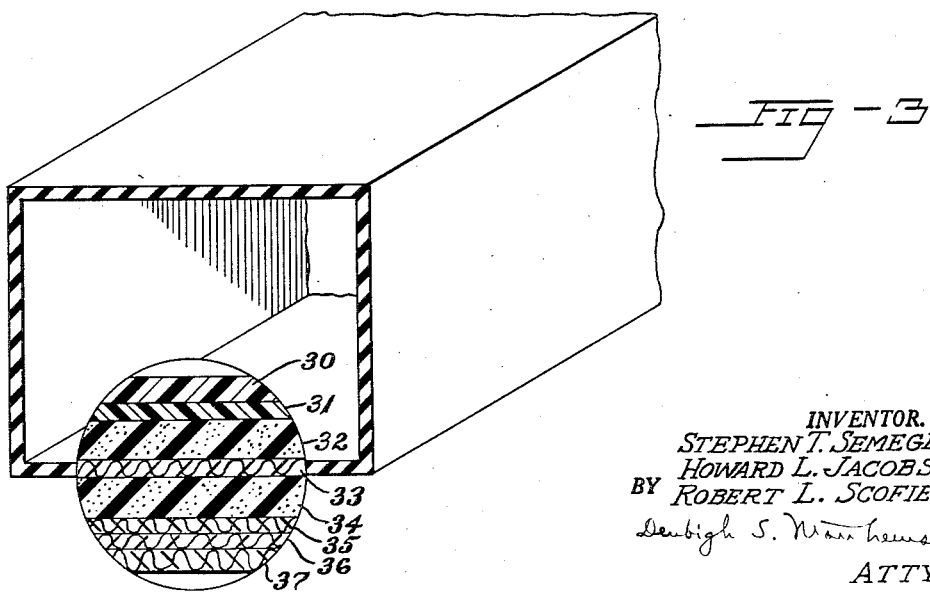
INVENTOR.
STEPHEN T. SEMEGEN
HOWARD L. JACOBS
BY ROBERT L. SCOFIELD
ATTY.

United States Patent Office 2,827,098
Patented Mar. 18, 1958

2,827,098

ARTICLE OF MANUFACTURE AND METHOD
FOR MAKING THE SAME

Stephen T. Semegen, Cuyahoga Falls, Howard L. Jacobs, Cleveland, and Robert L. Scofield, Akron, Ohio, assignors to The B. F. Goodrich Company, New York, N. Y., a corporation of New York Application October 22, 1954, Serial No. 464,076

22 Claims. (Cl. 152—347)

This invention pertains to a self-sealing article of manufacture and to a method for making the same. More specifically, the present invention relates to a pneumatic tire or tube having a novel self-sealing or sealant composition comprising a polyacrylate disposed in the interior of the tire or tube and to a method for making the same.

During the manufacture of a tire, conventional sealants require that the tire be cooled in the mold under pressure for a considerable period of time to avoid blowing of the sealant. Obviously, this increases the time required for building a tire and reduces the number of molds available for immediate use. Moreover, a sealant required for tires and also for fuel cells must be tacky and nervy, that is, it must be able to hold itself together and be able to return to its former position after deformation. However, many sealants presently available do not possess these properties in the required degree.

Accordingly, it is a primary object of the present invention to provide a novel article of manufacture having improved puncture sealing or self-sealing properties.

It is another object of the present invention to provide a tire having a puncture sealant which does not form ridges and valleys in its surface after extended service and which is highly resistant to oxidation.

Still another object is to provide a tubeless tire or a tube having a puncture sealing composition characterized by high nerve, self-sealing ability, tack, and good hot strength.

A further object is to provide a tubeless tire with a composition which seals against punctures at low temperatures and which does not flow to the crown of the tire under service conditions.

A still further object of this invention is to provide a tire with a sealing composition which will enable the tire to be pulled from the mold while hot.

Yet another object is to provide a novel method for making an article of manufacture exhibiting self-sealing properties.

Another object is to provide a method for vulcanizing an article of manufacture containing a puncture sealing composition, said method characterized in that the article does not require cooling under pressure after vulcanizing.

These and other objects and advantages of the present invention will become more apparent to those skilled in the art from the following detailed description, examples and drawing, wherein:

Fig. 1 is a vertical cross-sectional view partly in perspective of a tire constructed in accordance with and embodying the invention, Fig. 2 is a vertical cross-sectional view partly in perspective of an inner tube constructed in accordance with and embodying the invention, and Fig. 3 is a vertical cross-sectional view partly in perspective and partly enlarged of a fuel cell embodying the present invention.

It has now been discovered according to the present invention that a certain polyacrylate composition to be hereinafter described is highly useful as a sealant or a self-sealing composition in tires, tubes and fuel cells and other articles subject to puncturing. The composition is nervy so that on puncturing a tire and removing the puncture producing element, the hole left by the element is immediately closed. It also is tacky and adheres not only to itself but also to the puncture producing element so that when the element is removed from the tire, a portion of the sealant will enter the hole produced by the element to seal it. Accordingly, due to its nerve and tack the sealant composition not only closes the hole left by the element but also tends to plug it. The sealant is adherent to the liner or the inside of the tire carcass so that special adhesives are not required, and it does not become brittle when subjected to a temperature of as low as about —40° C. The sealant exhibits good aging, little or no cold flow, and does not tend to flow when hot to build-up in the crown of the tire and to form ridges and valleys resulting in points of stress concentration which produce cracks which propagate themselves through the sealant and the carcass. A feature of the use of the sealant composition of the present invention is that a tire, tube, or other article embodying it, after vulcanization, can be pulled hot from the mold and permitted to air cool, or to cool at a pressure less than that used in vulcanizing, because the sealant does not "blow" as compared to other sealant compositions. This results in a great increase in production by savings in time and permits a greater use of the molds required for curing. Furthermore, the sealant may also be blended with other polymers such as the rubbery conjugated dienes without detracting from its useful properties and with some improvement in certain processing steps.

In building a tire using the sealant disclosed herein, the polyacrylate composition is thoroughly mixed with the compounding ingredients and then extruded into a band which is placed on the drum of a tire-building machine and an air impervious "butyl" rubber composition liner applied. If an adhesive is required between the sealant and liner or plies, it can be a mixture of nitrile rubber and a resorcinol-aldehyde resin. Next the various plies are added and the beads formed. Finally, the tread and sidewall are applied. The surfaces of the various layers may be tackified with one or more organic solvents just before assembling to overcome the effect of dusting with finely-divided soapstone. The assembly is then fitted with an air bag, placed in a mold and cured. At the end of the cure the vulcanized tire can be withdrawn hot from the mold without fear of the sealant blowing. Alternatively, the tire can be built as customarily done and the sealant layer applied last to the interior of the tire in the crown portion before or after cure. When making inner tubes, the inner tube material is extruded as a tube and slit along its length. The sealant is then inserted into the tube as a band. The slit and the ends of the tube and the band are then tapered. The cut portions of the tube and band are brought together. The band portions pressed together and the tube portions cemented together, and the unvulcanized tube containing the sealant placed in a mold and cured. Other methods for making the tire and tube can, of course, be performed.

As shown in the drawing, Fig. 1 of a representative tubeless tire, 1 is the tread which is united to one or more plies of calendered rubber cord 2—2 which terminate in bead portions 3—3. The sidewalls of the tire are indicated generally by the numerals 4—4. A substantially air-impervious liner 5 such as a "butyl" rubber composition, a copolymer of a predominating amount of isobutylene and the balance isoprene, which may or may not comprise reclaimed butyl and/or brominated "butyl," covers the entire inside area of the tire and may even extend around toe 6 and heel 7 of the bead to provide an air-tight seal. The axial outer face of the bead portion is formed of ribs 8—8 extending in a circumferentially continuous manner about the tire to effect sealing against leakage of air from the tire past the bead portion as well as entrance of extraneous materials from without. Modifications of the ribs can be made as shown in U. S. patent to Herzegh, No. 2,587,470 of February 26, 1952, and still other means of sealing can be made. Sealant 9 is disposed in adhering relationship with the liner in crown portion 10 of the tire, said crown portion being generally the area under the tread and extending somewhat into the sidewall areas, and is generally of crescent shape with the edges thereof tapering toward the sidewalls, the area of greatest thickness being substantially completely in the crown region itself. The sealant forms a continuous band around the interior of the tire although it is conceivable that it may be deposited and secured to the liner as a plurality of bands or of transverse strips. Since the sealant is substantially air-impervious, it may be used to entirely replace the "butyl" liner in that area of the tire in which it is placed, the "butyl" being used only in the remainder of the sidewalls and bead areas. Moreover, the "butyl" may be replaced with other vulcanizable rubbery materials such as natural rubber, blends of natural rubber and rubbery butadiene-styrene copolymers, acrylic rubbers, or mixtures thereof with or without "butyl" compositions if substantially complete air-imperviousness is not desired; or the liner may be omitted entirely or made thinner or part of the inner or first ply.

In Fig. 2 there is disclosed inner tube 20 of "butyl" or other flexible vulcanized rubber containing layer 21 of the sealant composition of the present invention disposed in crown portion 22 of the tube.

A self-sealing fuel cell or other container is illustrated in Fig. 3 and contains the novel sealant of the present invention. It comprises internal liner 30 of a fuel resistant rubber such as a copolymer of a major amount of butadiene-1,3 and the balance acrylonitrile, polychlorobutadiene-1,3, polysulfide or polyester rubber. Vapor barrier layer 31 of nylon or a linear superpolyamide deposited from an alcohol water solution which may contain a polyhydroxy benzene compound is secured to liner 30. The nylon barrier layer 31 may be positioned on the inner surface of the fuel resistant rubber layer 30 and adjacent the fuel so that layers 30 and 32 are essentially in contact with each other. Furthermore, in the fuel cell the fuel or oil-resistant rubber inner layer can be omitted so that the polyamide alone serves to prevent diffusion of the fuel. However, it is preferred that the inner layer be of fuel or oil-resistant rubber to protect the polyamide layer from wear, during handling, etc. Layer 32 of the sealant composition of the present invention is adhered to the barrier layer and also to fabric layer 33 of woven nylon, cotton and the like. Another layer 34 of the sealant of the present composition is added to the assembly along with one or more fabric layers 35, 36 and 37. The various fabric layers may be skim coated or calendered with rubber compositions or adhesives to obtain bonding on curing with adjacent layers of fabric or rubber. Likewise, adhesives are generally used between the liner, nylon and sealant layers to obtain the requisite degree of bonding. An outer coat (not shown) of a rubber-resin mixture may be applied to the cell before or after cure as a finish coat. In making a fuel cell of the above type the various layers beginning with the fuel resistant layer are applied to a cardboard form or other easily broken-up material, and the other layers successively added. The assembly is then cured followed by breaking up the form by treating it with water and removing it from the interior of the cell through ports provided therein.

The polyacrylates employed as the sealants of the present invention are homopolymers of alkyl acrylic acid esters in which the alkyl group has from 2 to 8 carbon atoms as shown by the formula:

$$CH_2=CH-COOR$$

where R is alkyl having from 2 to 8 carbon atoms. Examples of suitable alkyl acrylic acid esters are butyl acrylate, amyl acrylate, hexyl acrylate, heptyl acrylate, octyl acrylate, 3,3'-dimethyl butyl acrylate and the like. Co- or interpolymers of these alkyl acrylic acid esters can also be used such as the copolymer formed by the co- or interpolymerization of butyl acrylate and octyl acrylate. More than two of the foregoing alkyl acrylic acid esters may also be polymerized together. Moreover, a major amount of at least one of the above alkyl acrylic acid esters can be copolymerized with a minor amount, preferably not more than about 20%, by weight of at least one other copolymerizable monoolefinic monomer such as acrylonitrile, vinyl chloride, dichloro difluoro ethylene, B-chloroethyl vinyl ether, styrene, alpha monochlorostyrene, dichloro phenyl ethylene, alpha methyl styrene, vinylidene chloride, vinyl triethoxy silane, vinyl butyl cellosolve, normal butyl vinyl ether, N-vinyl-2-pyrrolidone, 2-ethoxy ethyl acrylate, 2-ethoxy ethyl methacrylate, sodium acrylate, sodium methacrylate, methacrylonitrile, beta cyano ethyl acrylate, beta hydroxy propyl acrylate, gamma hydroxy butyl acrylate, tetrahydro furfural acrylate, N-tertiary butyl acrylamide, 2-methoxy ethyl acrylate, 2-chloro ethyl methacrylate, dichloro maleic anhydride, crotonic acid, 2-butene-1,4-diol, and the like which will form tacky, nervy compositions having low brittle or freeze points and low flow properties at service temperatures. Very minor amounts of still other monomers copolymerizable with the alkyl acrylic acid ester monomers which may or may not include during polymerization the other monomers mentioned above may also be used, such as acrylic acid, methacrylic acid and the like. Copolymers formed by polymerizing at least one of the above alkyl acrylic acid esters or at least one of the above alkyl acrylic acid esters and at least one of the other monomers mentioned above in the presence of at least one previously polymerized homopolymer of one of the above alkyl acrylic acid esters, copolymer of two or more of the above alkyl acrylic acid esters, or copolymer of at least one of the above alkyl acrylic acid esters and at least one of the other monomers mentioned above can also be used. Furthermore, mixtures of the foregoing homopolymers, copolymers, etc., can also be blended together on a mill, by latex blending and the like and used in practice of the present invention.

These acrylates are prepared by polymerization in solvent, in bulk, or mass polymerization of the monomers or by the polymerization of the monomers in aqueous emulsion using a polymerization catalyst under refluxing conditions while agitating.

To improve processing on the rolls of a mill minor amounts of other rubbery polymers may be employed with the polyacrylates. By improved processing is meant ease in warming up the polyacrylate on the rolls of a rubber mill where it tends to splinter on the rolls, or go to the back roll, before it is placed in an extruder and extruded as a band. It, of course, is realized that such rubbery polymers are unnecessary where other means may be employed to warm up the polyacrylate or to form it into bands or strips of the desired length, thickness and shape. The rubbery polymers may also tend to lower the freeze point of the polyacrylate sealant.

Small amounts of the polyacrylate can also be used with large amounts of the rubber to impart to the rubber improved sealing and reduced flow in service while retaining ability of the sealant to operate at reduced temperatures. The added rubbery material will also tend to improve swelling properties of the polyacrylates when used in fuel cells adapted to contain fuels predominantly of aliphatic character.

The rubbery polymer which may be used to blend with the polyacrylate to improve processability is any vulcanizable rubber including such natural occurring crude rubbers as caoutchouc, which is essentially a rubber polymer of isoprene, and the like, or such synthetic rubbers as rubbery polychloroprene and rubbery polymers of the open-chain conjugated dienes having from 4 to 8 carbon atoms such as the butadiene-1,3 hydrocarbons which include butadiene-1,3, isoprene, 2,3-dimethyl butadiene-1,3, 1,4-dimethyl butadiene-1,3 and the like; or the rubbery copolymers of these and similar materials with each other or with such copolymerizable monomeric materials as isobutylene, styrene, acrylonitrile, methacrylonitrile, methyl acrylate, methyl methacrylate, ethyl acrylate, ethyl methacrylate, 2-vinyl pyridine and similar materials. The rubbery polymers contain at least 50% by weight of the conjugated diene and preferably from 50 to 90% by weight of the conjugated diene. Moreover, the rubbery polymer may be a polymer such as polyisobutylene and the like or a copolymer such as "butyl" rubber containing about 97% isobutylene and the balance isoprene as well as brominated "butyl" obtained by the treatment of "butyl" rubber with elemental bromine. Reclaimed rubber from tires, tubes, and other reclaimed rubbery polymeric materials may likewise be blended with the polyacrylate. Mixtures of the foregoing rubbery polymers can likewise be employed with one or more of the polyacrylates described above provided the total weight of the rubber and of the polyacrylate is maintained within the limits described below.

The ratio of polyacrylate to rubbery polymer in the sealant composition will vary from about 10 to 90 parts by weight of the polyacrylate to from 90 to 10 parts by weight of the rubbery polymer. The blends of polyacrylate and rubber may be prepared by latex blending and subsequent co-coagulation, by mixing on a conventional rubber mill, or by mixing in a Banbury. Preferred blends contain at least 50% of the polyacrylate and the balance the rubbery material.

In general, curing agents are not necessary when the polyacrylate disclosed herein is used alone as the self-sealing composition. However, if the curing agent and accelerator, if any, are used, they should be used in amounts necessary to obtain a partial cure of the sealant rather than a complete cure to avoid loss of its self-sealing characteristics such as tack and the like. However, where a blend is used comprising a polyacrylate and one of the foregoing rubbery polymers, it will be desirable to incorporate a curing agent such as sulfur and the like and an accelerator, if desired, to retard any tendency of the rubbery polymer component of the sealant to flow when hot. Moreover, the addition of curing agents may be desirable where the polyacrylate is to be used in a fuel cell to retard dissolution in the solvent on puncturing and to obtain swelling when reliance of the sealing is dependent more on the swelling action of the sealant rather than on its mechanical action especially where aromatic fuels are concerned. If the polyacrylate composition contains one of the rubbery polymers mentioned above and is to be used in a cell for containing predominantly aliphatic fuels, curing agents should also be present in the composition to prevent dissolution and provide swelling of the rubbery polymer.

Examples of suitable curing agents are triethyl trimethylene triamine and sulfur, triethylene tetramine and sulfur, sodium metasilicate pentahydrate, sodium hydroxide, paraquinone dioxime, red lead and paraquinone dioxime, zinc oxide, magnesium oxide, sulfur and the like.

Compounding ingredients may also be employed in the composition such as furnace carbon black which is preferred to channel black and black iron oxide which may have magnetic properties in amounts up to about 70 parts by weight based on 100 parts of the rubber present without loss of the necessary tack. Other materials such as arc silica, precipitated silica, calcium silicate, rosin, hydrogenated rosin, silicon monoxide or "Monox," zinc stearate, stearic acid, processing oils, wool grease, dibutyl phthalate and other plasticizers for synthetic rubbers such as high molecular weight polyethers and the like may also be employed in various amounts as needed. Where diene rubbers are employed, antioxidants may also be incorporated in the composition.

Times, temperatures and pressure employed in curing can be varied to obtain the desired degree of cure or to control the rate of cure in view of the polymers employed and the type and amount of curing agent and accelerator present.

The following examples will serve to illustrate the invention with more particularity to those skilled in the art:

Example I

Polybutylacrylate was prepared using the following recipe:

| Component: | Parts by weight |
|---|---|
| Butyl acrylate | 100 |
| Potassium persulfate | 1 |
| Sodium pyrophosphate | 1 |
| Santomerse S (salts of a homologous series of substituted aromatic sulfonic acids—Monsanto Chemical Co.) dry weight | 2 |
| Daxad 11-P (polymerized sodium salts of alkyl aryl and aryl alkyl sulfonic acids—Dewey and Almy Chem. Co.) | 1 |
| Distilled water | 100 |

The potassium persulfate and sodium pyrophosphate were dissolved in a portion of the water and added to a polymerization bottle. The Santomerse S and Daxad 11-P were also added to a portion of the water and added to the polymerization bottle. The remainder of the water and the monomer were then added to the polymerization bottle which was agitated at a temperature of about 50° C. The resultant latex was then coagulated using conventional methods and the crumbs washed, dried and mixed on a roll mill to form a band. Several compositions were prepared using the above prepared polybutylacrylate, furnace black and stearic acid by compounding on a mill. Discs were cut from the compositions and mounted on the open end of a cylinder and clamped tightly thereto. The cylinder was filled with air under pressure and each disc was then punctured several times with a nail and then with a spike. After each puncture, the cylinder was immersed in water to test for air leaks. Except for a slight initial loss in air on removal of the puncturing elements no loss of air pressure was observed over a considerable period of time. The compositions so prepared and the results obtained using them are shown below:

| Ingredients | Parts By Weight in Compositions A to E | | | | |
|---|---|---|---|---|---|
| | A | B | C | D | E |
| Polybutylacrylate | 100 | 100 | 100 | 100 | 100 |
| Philblack A (medium abrasion furnace black) | 10 | 20 | 30 | 40 | 50 |
| Stearic acid | 2 | 2 | 2 | 2 | 2 |
| Total | 112 | 122 | 132 | 142 | 152 |

|  | Tests on Compositions A to E | | | | | Conventional Sealant |
| --- | --- | --- | --- | --- | --- | --- |
|  | A | B | C | D | E |  |
| Nail puncture | Passed | Passed | Passed | Passed | Passed | Passed. |
| Spike puncture | do | do | do | do | do | Do. |
| Mooney plasticity (Large rotor at 212° F.) | 30 | 33 | 34 | 41 | 39 | 50. |
| Retentivity Value | 0.737 | 0.707 | 0.618 | 0.423 | 0.455 | 0.891. |

The above tests show that the polyacrylate composition is as good as a conventional sealant composition as to the nail and spike tests and exhibits a satisfactory Mooney and better retentivity values. The retentivity values are expressions of the nerviness of the sealant or of the ability of the sealant to return to its former position or shape when distorted. A low retentivity figure is indicative of a high degree of return or nerviness. The retentivity values may be determined by using the equation $$R=\frac{H_0-H_2}{H_0-H_1}$$

where $H_0$ is the original height of a sample of sealant to be distorted, $H_1$ is the height of the same after a certain period of time under a given load and $H_2$ is the height of the sample after the load has been removed for a certain period of time. The retentivity data, thus, show that the composition has high nerviness which is necessary in puncture sealing. The Mooney plasticity data show that the composition can have a low Mooney and still be self-sealing and exhibit satisfactory retentivity.

*Example II*

75 parts of polybutylacrylate were mixed with 25 parts of a copolymer of 95 parts of ethylacrylate and 5 parts of beta chloroethyl vinyl ether prepared in a manner similar to that shown in Example I, above, 50 parts of medium abrasion furnace carbon black and 2 parts of stearic acid, all parts being by weight. The resulting composition was tested as to puncture sealing properties according to the method of Example I above and was satisfactory. It had a Mooney plasticity of 42 and a retentivity value of 0.308.

*Example III*

Polybutylacrylate was mixed with a minor amount of "vistanex" ("Vistanex B-100," polyisobutylene of molecular weight of about 100,000, Enjay Co.), to form mixtures of varying weight ratios: 95:5, 90:10, 85:15, 80:20, and 75:25. By weight, 100 parts of each mixture were blended with 50 parts of medium abrasion furnace black and 2 parts of stearic acid. Only the blend with the smallest amount of vistanex tended to splinter on the mill, however, this was not too objectionable since it could otherwise be handled. All of the blends were tested as to puncture sealing characteristics according to the method of Example I, above. The Mooney plasticity and retentivity values of these compositions were also determined. The results of the tests are shown below:

| Ratio of Polybutylacrylate to "Vistanex" | 95/5 | 90/10 | 85/15 | 80/20 | 75/25 |
| --- | --- | --- | --- | --- | --- |
| Nail puncture | Passed | Passed | Passed | Passed | Passed. |
| Spike puncture | do | do | do | do | Do. |
| Mooney plasticity | 42 | 46 | 46 | 47 | 54. |
| Retentivity value | 0.449 | 0.351 | 0.398 | 0.376 | 0.422. |

*Example IV*

A tetrapolymer was prepared by copolymerizing in parts by weight, 90 parts of butyl acrylate, 5 parts of beta chloroethyl vinyl ether, 2½ parts of acrylic acid and 2½ parts of methacrylic acid. The preparation of the tetrapolymer was similar to that of Example I, above, except that the pH of Santomerse-Daxad solution was adjusted to between 4-6 with concentrated HCl before addition to the polymerization vessel. Compositions were prepared, in parts by weight, of 100 parts of the resulting polymer, 2 parts of stearic acid, and medium abrasion furnace carbon black in amounts of 10, 20, 30, 40 and 50 parts. Each of the compositions exhibited satisfactory processing, and they successfully passed the puncture sealing test described in Example I, above, and showed acceptable Mooney and retentivity values as shown below:

| Ratio of Tetrapolymer to Carbon Black | 100/10 | 100/20 | 100/30 | 100/40 | 100/50 |
| --- | --- | --- | --- | --- | --- |
| Nail puncture | Passed | Passed | Passed | Passed | Passed. |
| Spike puncture | do | do | do | do | Do. |
| Mooney plasticity | 45 | 54 | 60 | 72 | 67. |
| Retentivity value | 0.322 | 0.297 | 0.330 | 0.342 | 0.344. |

This example illustrates the fact that even though the above compositions of the present invention show high Mooney plasticity values, they are still useful as self-sealing materials.

*Example V*

Tires were built using a polybutylacrylate composition and tested using accepted test methods for determining properties required for sealants. The cured tires could be pulled hot from the mold as compared to tires containing a conventional rubber composition sealant which required mold cooling for 15–20 minutes before they could be removed. After road tests of 19,000 miles with 20% overload, the sealant showed no tendency to flow to crown of tires or to form ridges and valleys as contrasted to a conventional sealant. Moreover, while some slight cracking of the surface exposed to the interior of the tires developed, there appeared no tendency for the cracks to grow or to propagate through the tire carcass itself to cause a blowout and the cracks did not interfere with puncture sealing. Moreover, the tires containing the polybutylacrylate sealants satisfactorily passed the indoor and outdoor nail and spike board tests as well as the speed flow tests.

*Example VI*

Polybutylacrylate was warmed up on a rubber mill with "butyl" rubber and various compounding ingredients. The components of the composition and their weights are indicated below:

| Ingredients | Parts by Weight of Components of Compositions A to C | | |
| --- | --- | --- | --- |
|  | A | B | C |
| Polybutylacrylate | 15 | 25 | 35 |
| "Butyl" rubber (about 97% isobutylene and the balance isoprene) | 98 | 98 | 98 |
| Zinc peroxide + "butyl" rubber (50-50) | 4 | 4 | 4 |
| Black Iron oxide (Ferrosoferric oxide, analysis: about 76% Fe₂O₃ and 23% FeO, bal. imp.) | 68 | 68 | 68 |
| Stearic acid | 2.5 | 2.5 | 2.5 |
| Non-oxidizing rosin (hydrogenated abietic acid composition) | 8 | 5 | 2 |
| Zinc oxide | 5 | 5 | 5 |
| Paraquinone dioxime | .9 | .3 | .3 |
| "Vistac #1" (polybutylenes, mol. wt.— 1,000–1,100, Advance Solvents and Chem. Corp.) | 12 | 12 | 12 |
| Light process oil (Spec. grav. .915—.925 at 60° F., Viscosity S. U. 150—160 sec. at 100° F.) | 3.4 | 3.4 | 3.4 |

The above compositions were extruded and then used as the sealant layers in building tires which were vulcanized at 302° F.—55 min. cycle. Tests on tires using the above compositions showed that they successfully passed the indoor and outdoor nail and spike board test. The sealants did not tend to flow to the crowns of the tires and did not exhibit cracking.

*Example VII*

Other compositions were prepared and tested in tires. These compositions are shown below:

| Ingredients | Parts by weight of components of Compositions A to F | | | | | |
|---|---|---|---|---|---|---|
| | A | B | C | D | E | F |
| Polybutylacrylate | 30 | 70 | 50 | 50 | 50 | 50 |
| GR-S rubber (about 72 butadiene—28 styrene) | 70 | 30 | | | | 25 |
| GR-S rubber (about 72 butadiene—28 styrene—low temperature) | | | 50 | | | |
| Natural rubber | | | | 50 | 50 | 25 |
| Furnace Carbon black (medium abrasion) | 20 | 20 | 20 | 20 | 20 | 20 |
| Black Iron oxide (Ferrosoferric oxide, analysis: about 76% Fe$_2$O$_3$ and 23% FeO, bal. imp.) | 30 | 30 | 30 | 30 | 30 | 30 |
| Non-oxidizing rosin (hydrogenated abietic acid composition) | 10 | 2.5 | 5 | 5 | 5 | 5 |
| Zinc oxide | .3 | 3 | 3 | 3 | 3 | 3 |
| Stearic acid | 1.5 | 1.5 | | 1.5 | 1.5 | 1.5 |
| Sulfur | .45 | .2 | .3 | .5 | .3 | .4 |
| N-cyclohexyl-2-mercapto benzothiazole sulfene amide | .65 | .3 | .45 | .6 | .45 | .5 |
| Phenyl hydrazine | 1.0 | .5 | 1.0 | .5 | .5 | .5 |
| Process oil (Viscosity S. U. 80–90 sec. at 210° F., specific gravity .900–.930 at 125° F.) | 15 | 10 | 15 | 15 | 15 | 15 |

All of the above compositions were readily mixed on the mill, extruded, and used to build tubeless tires which were cured at about 302° F. for a 55 minute cycle. Each tire was removed from the mold hot without blowing. Each tire was tested and it successfully passed indoor and outdoor puncture sealing tests. The sealants exhibited no tendency to flow to the crowns of the tires and little or no cracking after extended road tests.

Still other compositions were prepared and used as the sealant in tires. The components of the compositions and the results of tests on tires using these compositions are set forth in the example below:

*Example VIII*

| Ingredients in Compositions | Parts by Weight of Components of Compositions A to D | | | |
|---|---|---|---|---|
| | A | B | C | D |
| Polybutylacrylate | 50 | 50 | 50 | 50 |
| "Butyl" rubber | 50 | 50 | 25 | |
| Vistanex ("Vistanex B–100," polyisobutylene of molecular weight of about 100,000, Enjay Co) | | | 25 | 50 |
| Furnace Carbon black (medium abrasion) | 20 | 20 | 20 | 20 |
| Black Iron oxide (Ferrosoferric oxide, analysis: about 76% Fe$_2$O$_3$ and 23% FeO, bal. imp.) | 30 | 30 | 30 | 30 |
| Zinc oxide | 3 | 3 | 3 | 3 |
| Stearic acid | 1.5 | 1.5 | 1.5 | 1.5 |
| Sulfur | .5 | | | |
| Tetramethyl thiuram disulfide | .4 | | | |
| 2-mercaptobenzothiazole | .2 | | | |
| Light process oil (Specific gravity .880–.890 at 60° F., viscosity S. U. 100–115 sec. at 100° F.) | 10 | 10 | 10 | 10 |
| Vistac ("Vistac #1," polybutylenes of molecular weight of about 1,000–1,100, Advance Solvents and Chem. Corp.) | 5 | 5 | 5 | 5 |
| Paraquinone dioxime and clay (33/67) | | .6 | .6 | 1.2 |

The above compositions could readily be processed on rubber machinery and extruded into bands. When cured with a tire carcass at about 302° F. for a 55 min. cycle, the sealants did not blow after cure although the tires were withdrawn from the mold hot. Moreover, tires with these compositions successfully passed indoor and outdoor puncture tests. The sealants did not appreciably crack and showed no tendency to flow to the crown of the tires after road tests.

In summary, the present invention teaches that sealant compositions comprising a polyacrylate of an acrylic acid ester having the formula $$CH_2=CH-COOR$$

where R is alkyl having from 2 to 8 carbon atoms are highly useful as puncture sealants or self-sealing composition in articles of manufacture susceptible to puncturing such as pneumatic tires or tubes. The sealant does not exhibit any appreciable tendency to cold flow nor to flow to the crown of the tire when in use for long periods. It is essentially crack free and highly resistant to attack by oxygen. Moreover, tires fabricated with the novel sealant of the present invention can be pulled hot from their molds immediately after cure in contrast to the cooldown period which must be observed when employing presently available sealants. Furthermore, other rubbery polymers may be added to the polyacrylates without detracting from their good characteristics as a sealant and which aid in processing. Fuel cells can also be made employing the composition disclosed herein as the self-sealing layer or layers. It is apparent that the invention is not to be limited to tires, tubes, or fuel cells but that the construction shown herein will be useful in many articles of manufacture where a nervy, tacky, self-sealing composition is employed, especially where the sealant must not flow under service conditions yet must still be self-sealing at low temperatures.

What is claimed:

1. A laminated article of manufacture comprising a layer of a puncturable vulcanized rubbery material and a layer of a self-sealing composition disposed in puncture sealing relationship with said layer of vulcanized rubbery material, said self-sealing composition comprising a tacky, adherent composition containing a rubber comprising at least one polyacrylate selected from the group consisting of a homopolymer of an acrylic acid ester, a copolymer comprising essentially acrylic acid esters, a copolymer comprising essentially a major amount of at least one acrylic acid ester and a minor amount of at least one other copolymerizable monoolefinic monomer selected from a first-named class consisting of acrylonitrile, vinyl chloride, dichloro difluoro ethylene, B-chloroethyl vinyl ether, styrene, alpha monochlorostyrene, dichloro phenyl ethylene, alpha methyl styrene, vinylidene chloride, vinyl triethoxy silane, vinyl butyl cellosolve, normal butyl vinyl ether, N-vinyl-2-pyrrolidone, 2-ethoxy ethyl acrylate, 2-ethoxy ethyl methacrylate, sodium acrylate, sodium methacrylate, methacrylonitrile, beta cyano ethyl acrylate, beta hydroxy propyl acrylate, gamma hydroxy butyl acrylate, tetrahydro furfural acrylate, N-tertiary butyl acrylamide, 2-methoxy ethyl acrylate, 2-chloro ethyl methacrylate, dichloro maleic anhydride, crotonic acid and 2-butene-1,4-diol, a copolymer comprising essentially a major amount of at least one acrylic acid ester and a very minor amount of at least one other copolymerizable monoolefinic monomer selected from a second-named class consisting of acrylic acid and methacrylic acid, a copolymer comprising essentially a major amount of at least one acrylic acid ester, a minor amount of at least one other copolymerizable monoolefinic monomer selected from said first-named class and a very minor amount of at least one other copolymerizable monoolefinic monomer selected from said second-named class, a polymeric composition obtained by polymerizing in the presence of at least one of said polyacrylates at least one of the foregoing monomeric acrylic acid ester compositions forming said polyacrylates and blends thereof, said acrylic acid ester having the formula $CH_2=CH-COOR$ where R is alkyl having from 2 to 6 carbon atoms.

2. A container for a fluid comprising a layer of a puncturable vulcanized rubbery material and a layer of a self-sealing composition disposed in puncture sealing relationship with said layer of vulcanized rubbery material, said self-sealing composition comprising a tacky, self-adherent composition containing a rubber comprising at least one polyacrylate selected from the group consisting of a homopolymer of an acrylic acid ester, a copolymer comprising essentially acrylic acid esters, a copolymer comprising essentially a major amount of at least one acrylic acid ester and not more than about 20% by weight of at least one other copolymerizable monoolefinic monomer selected from a first-named class consisting of acrylonitrile, vinyl chloride, dichloro difluoro ethylene, B-chloroethyl vinyl ether, styrene, alpha monochlorostyrene, dichloro phenyl ethylene, alpha methyl styrene, vinylidene chloride, vinyl triethoxy silane, vinyl butyl cellosolve, normal butyl vinyl ether, N-vinyl-2-pyrrolidone, 2-ethoxy ethyl acrylate, 2-ethoxy ethyl methacrylate, sodium acrylate, sodium methacrylate, methacrylonitrile, beta cyano ethyl acrylate, beta hydroxy propyl acrylate, gamma hydroxy butyl acrylate, tetrahydro furfural acrylate, N-tertiary butyl acrylamide, 2-methoxy ethyl acrylate, 2-chloro ethyl methacrylate, dichloro maleic anhydride, crotonic acid and 2-butene-1,4-diol, a copolymer comprising essentially a major amount of at least one acrylic acid ester and a very minor amount of at least one other copolymerizable monoolefinic monomer selected from a second-named class consisting of acrylic acid and methacrylic acid, a copolymer comprising essentially a major amount of at least one acrylic acid ester, not more than about 20% by weight of at least one other copolymerizable monoolefinic monomer selected from said first-named class and a very minor amount of at least one other copolymerizable monoolefinic monomer selected from said second-named class, a polymeric composition obtained by polymerizing in the presence of at least one of said polyacrylates at least one of the foregoing monomeric acrylic acid ester compositions forming said polyacrylates and blends thereof, said acrylic acid ester having the formula $CH_2=CH-COOR$ where R is alkyl having from 2 to 8 carbon atoms.

3. An article of manufacture comprising a hollow, annular body, the sides and crown portion of said body comprising a vulcanized, non-tacky material comprising a rubbery polymer and a layer of a puncture sealant disposed inside said body and adhered to the inner surface of said crown portion of said material, said sealant comprising a tacky, adherent composition containing a rubber comprising at least one polyacrylate selected from the group consisting of a homopolymer of an acrylic acid ester, a copolymer comprising essentially acrylic acid esters, a copolymer comprising essentially a major amount of at least one acrylic acid ester and not more than about 20% by weight of at least one other copolymerizable monoolefinic monomer selected from a first-named class consisting of acrylonitrile, vinyl chloride, dichloro difluoro ethylene, B-chloroethyl vinyl ether, styrene, alpha monochlorostyrene, dichloro phenyl ethylene, alpha methyl styrene, vinylidene chloride, vinyl triethoxy silane, vinyl butyl cellosolve, normal butyl vinyl ether, N-vinyl-2-pyrrolidone, 2-ethoxy ethyl acrylate, 2-ethoxy ethyl methacrylate, sodium acrylate, sodium methacrylate, methacrylonitrile, beta cyano ethyl acrylate, beta hydroxy propyl acrylate, gamma hydroxy butyl acrylate, tetrahydro furfural acrylate, N-tertiary butyl acrylamide, 2-methoxy ethyl acrylate, 2-chloro ethyl methacrylate, dichloro maleic anhydride, crotonic acid and 2-butene-1,4-diol, a copolymer comprising essentially a major amount of at least one acrylic acid ester and a very minor amount of at least one other copolymerizable monoolefinic monomer selected from a second-named class consisting of acrylic acid and methacrylic acid, a copolymer comprising essentially a major amount of at least one acrylic acid ester, not more than about 20% by weight of at least one other copolymerizable monoolefinic monomer selected from said first-named class and a very minor amount of at least one other copolymerizable monoolefinic monomer selected from said second-named class, a polymeric composition obtained by polymerizing in the presence of at least one of said polyacrylates at least one of the foregoing monomeric acrylic acid ester compositions forming said polyacrylates and blends thereof, said acrylic acid ester having the formula $CH_2=CH-COOR$ where R is alkyl having from 2 to 8 carbon atoms.

4. A pneumatic tube comprising a continuous, hollow, annular body having a crown portion and comprising a substantially air-impervious non-tacky material comprising a rubbery polymer and a continuous annular layer of a puncture sealant disposed inside said body and adhered to the inner surface of said crown portion of said rubbery polymer, said sealant comprising a tacky, adherent composition containing a rubber comprising a polyacrylate selected from the group consisting of a homopolymer of an acrylic acid ester, a copolymer comprising essentially acrylic acid esters, a copolymer comprising essentially a major amount of at least one acrylic acid ester and not more than about 20% by weight of at least one other copolymerizable monoolefinic monomer selected from a first-named class consisting of acrylonitrile, vinyl chloride, dichloro difluoro ethylene, B-chloroethyl vinyl ether, styrene, alpha monochlorostyrene, dichloro phenyl ethylene, alpha methyl styrene, vinylidene chloride, vinyl triethoxy silane, vinyl butyl cellosolve, normal butyl vinyl ether, N-vinyl-2-pyrrolidone, 2-ethoxy ethyl acrylate, 2-ethoxy ethyl methacrylate, sodium acrylate, sodium methacrylate, methacrylonitrile, beta cyano ethyl acrylate, beta hydroxy propyl acrylate, gamma hydroxy butyl acrylate, tetrahydrofurfural acrylate, N-tertiary butyl acrylamide, 2-methoxy ethyl acrylate, 2-chloro ethyl methacrylate, dichloro maleic anhydride, crotonic acid and 2-butene-1,4-diol, a copolymer comprising essentially a major amount of at least one acrylic acid ester and a very minor amount of at least one other copolymerizable monoolefinic monomer selected from a second-named class consisting of acrylic acid and methacrylic acid, a copolymer comprising essentially a major amount of at least one acrylic acid ester, not more than about 20% by weight of at least one other copolymerizable monoolefinic monomer selected from said first-named class and a very minor amount of at least one other copolymerizable monoolefinic monomer, selected from said second-named class, a polymeric composition obtained by polymerizing in the presence of at least one of said polyacrylates at least one of the foregoing monomeric acrylic acid ester compositions forming said polyacrylates and blends thereof, said acrylic acid ester having the formula $$CH_2=CH-COOR$$

where R is alkyl having from 2 to 8 carbon atoms.

5. A pneumatic tube according to claim 4 where said air-impervious material comprises a copolymer of a major amount of isobutylene and the balance isoprene and wherein the rubber in said sealant composition contains additionally a rubbery polymer other than said polyacrylate in an amount of from about 10 to 90% by weight, the balance being essentially said polyacrylate.

6. A pneumatic tire comprising, in combination, a hollow, open-bellied, annular body having a tread, sidewalls extending from said tread and containing beads, at least one cord ply bonded to and reinforcing said walls and united to said tread, and a substantially air-impervious, non-tacky layer comprising a rubbery polymer adhered to the inside of said tire along the sidewalls and crown and extending from bead portion to bead portion, and a continuous, annular layer of a puncture sealant disposed inside said tire and adhered to the inner surface of said crown portion of said substantially air-impervious layer, said sealant comprising a tacky, adherent composition containing a rubber comprising at least one polyacrylate selected from the group consisting of a homopolymer of an acrylic acid ester, a copolymer comprising essentially acrylic acid esters, a copolymer comprising essentially a major amount of at least one acrylic acid ester and not more than about 20% by weight of at least one other copolymerizable monoolefinic monomer selected from a first-named class consisting of acrylonitrile, vinyl chloride, dichloro difluoro ethylene, B-chloroethyl vinyl ether, styrene, alpha monochlorostyrene, dichloro phenyl ethylene, alpha methyl styrene, vinylidene chloride, vinyl triethoxy silane, vinyl butyl cellosolve, normal butyl vinyl ether, N-vinyl-2-pyrrolidone, 2-ethoxy ethyl acrylate, 2-ethoxy ethyl methacrylate, sodium acrylate, sodium methacrylate, methacrylonitrile, beta cyano ethyl acrylate, beta hydroxy propyl acrylate, gamma hydroxy butyl acrylate, tetrahydro furfural acrylate, N-tertiary butyl acrylamide, 2-methoxy ethyl acrylate, 2-chloro ethyl methacrylate, dichloro maleic anhydride, crotonic acid and 2-butene-1,4-diol, a copolymer comprising essentially a major amount of at least one acrylic acid ester and a very minor amount of at least one other copolymerizable monoolefinic monomer selected from a second-named class consisting of acrylic acid and methacrylic acid, a copolymer comprising essentially a major amount of at least one acrylic acid ester, not more than about 20% by weight of at least one other copolymerizable monoolefinic monomer selected from said first-named class and a very minor amount of at least one other copolymerizable monoolefinic monomer selected from said second-named class, a polymeric composition obtained by polymerizing in the presence of at least one of said polyacrylates at least one of the foregoing monomeric acrylic acid ester compositions forming said polyacrylates and blends thereof, said acrylic acid ester having the formula $CH_2=CH-COOR$ where R is alkyl having from 2 to 8 carbon atoms.

7. A pneumatic tire according to claim 6 where said substantially air-impervious layer comprises a copolymer of a major amount of isobutylene and the balance isoprene.

8. A pneumatic tire according to claim 6 in which said acrylic acid ester comprises butyl acrylate.

9. A pneumatic tire according to claim 7 where the rubber in said sealant composition contains additionally a rubbery polymer other than said polyacrylate in an amount of from about 10 to 90% by weight, the balance being essentially said polyacrylate.

10. A pneumatic tire according to claim 9 where said rubbery polymer in said sealant comprises a polymer of isobutylene.

11. A pneumatic tire according to claim 9 where said rubbery polymer in said sealant comprises a copolymer of at least 50% by weight of butadiene-1,3 and the balance styrene.

12. A pneumatic tire according to claim 9 where said rubbery polymer in said sealant comprises natural rubber.

13. A pneumatic tire according to claim 9 where said rubbery polymer in said sealant comprises a copolymer of at least 50% by weight of butadiene-1,3 and the balance methyl acrylate.

14. The method of making a laminated article which comprises associating a layer of a self-sealing composition in puncture sealing relationship with a layer of a puncturable vulcanizable unvulcanized rubbery composition and vulcanizing said rubbery composition containing a layer of said self-sealing composition, said self-sealing composition comprising a tacky, adherent composition containing a rubber comprising at least one polyacrylate selected from the group consisting of a homopolymer of an acrylic acid ester, a copolymer comprising essentially acrylic acid esters, a copolymer comprising essentially a major amount of at least one acrylic acid ester and a minor amount of at least one other copolymerizable monoolefinic monomer selected from a first-named class consisting of acrylonitrile, vinyl chloride, dichloro difluoro ethylene, B-chloroethyl vinyl ether, styrene, alpha monochlorostyrene, dichloro phenyl ethylene, alpha methyl styrene, vinylidene chloride, vinyl triethoxy silane, vinyl butyl cellosolve, normal butyl vinyl ether, N-vinyl-2-pyrrolidone, 2-ethoxy ethyl acrylate, 2-ethoxy ethyl methacrylate, sodium acrylate, sodium methacrylate, methacrylonitrile, beta cyano ethyl acrylate, beta hydroxy propyl acrylate, gamma hydroxy butyl acrylate, tetrahydro furfural acrylate, N-tertiary butyl acrylamide, 2-methoxy ethyl acrylate, 2-chloro ethyl methacrylate, dichloro maleic anhydride, crotonic acid and 2-butene-1,4-diol, a copolymer comprising essentially a major amount of at least one acrylic acid ester and a very minor amount of at least one other copolymerizable monoolefinic monomer selected from a second-named class consisting of acrylic acid and methacrylic acid, a copolymer comprising essentially a major amount of at least one acrylic acid ester, a minor amount of at least one other copolymerizable monoolefinic monomer selected from said first-named class and a very minor amount of at least one other copolymerizable monoolefinic monomer selected from said second-named class, a polymeric composition obtained by polymerizing in the presence of at least one of said polyacrylates at least one of the foregoing monomeric acrylic acid ester compositions forming said polyacrylates and blends thereof, said acrylic acid ester having the formula $CH_2=CH-COOR$ where R is alkyl having from 2 to 8 carbon atoms.

15. The method of making a laminated article which comprises associating a layer of self-sealing composition in puncture sealing relationship with a layer of a puncturable vulcanizable unvulcanized rubbery composition, subjecting said article to heat and pressure to vulcanize the same, and cooling said vulcanized article at a pressure less than the vulcanizing pressure, said self-sealing composition comprising a tacky, adherent composition containing a rubber comprising at least one polyacrylate selected from the group consisting of a homopolymer of an acrylic acid ester, a copolymer comprising essentially acrylic acid esters, a copolymer comprising essentially a major amount of at least one acrylic acid ester and not more than about 20% by weight of at least one other copolymerizable monoolefinic monomer selected from a first-named class consisting of acrylonitrile, vinyl chloride, dichloro difluoro ethylene, B-chloroethyl vinyl ether, styrene, alpha monochlorostyrene, dichloro phenyl ethylene, alpha methyl styrene, vinylidene chloride, vinyl triethoxy silane, vinyl butyl cellosolve, normal butyl vinyl ether, N-vinyl-2-pyrrolidone, 2-ethoxy ethyl acrylate, 2-ethoxy ethyl methacrylate, sodium acrylate, sodium methacrylate, methacrylonitrile, beta cyano ethyl acrylate, beta hydroxy propyl acrylate, gamma hydroxy butyl acrylate, tetrahydro furfural acrylate, N-tertiary butyl acrylamide, 2-methoxy ethyl acrylate, 2-chloro ethyl methacrylate, dichloro maleic anhydride, crotonic acid and 2-butene-1,4-diol, a copolymer comprising essentially a major amount of at least one acrylic acid ester and a very minor amount of at least one other copolymerizable monoolefinic monomer selected from a second-named class consisting of acrylic acid and methacrylic acid, a copolymer comprising essentially a major amount of at least one acrylic acid ester, not more than about 20% by weight of at least one other copolymerizable monoolefinic monomer selected from said first-named class and a very minor amount of at least one other copolymerizable monoolefinic monomer selected from said second-named class, a polymeric composition obtained by polymerizing in the presence of at least one of said polyacrylates at least one of the foregoing monomeric acrylic acid ester compositions forming said polyacrylates and blends thereof, said acrylic acid ester having the formula $$CH_2=CH-COOR$$

where R is alkyl having from 2 to 8 carbon atoms.

16. The method according to claim 15 in which said acrylic acid ester comprises butyl acrylate.

17. The method according to claim 15 where said puncturable vulcanizable unvulcanized rubbery composition comprises a rubbery material which is essentially air-impervious when vulcanized.

18. The method according to claim 17 where the rubber in said self-sealing composition contains additionally a rubbery polymer other than said polyacrylate in an amount of from about 10 to 90% by weight, the balance being essentially said polyacrylate.

19. The method according to claim 18 where said rubbery polymer in said self-sealing composition comprises a polymer of isobutylene.

20. The method according to claim 18 where said rubbery polymer in said self-sealing composition comprises a copolymer of at least 50% by weight of butadiene-1,3 and the balance styrene.

21. The method according to claim 18 where said rubbery polymer in said self-sealing composition comprises natural rubber.

22. The method according to claim 18 where said rubbery polymer in said self-sealing composition comprises a copolymer of at least 50% by weight of butadiene-1,3 and the balance methyl acrylate.

References Cited in the file of this patent

UNITED STATES PATENTS

| | | |
|---|---|---|
| 2,438,965 | Dasher | Apr. 6, 1948 |
| 2,566,384 | Tilton | Sept. 4, 1951 |
| 2,587,470 | Herzegh | Feb. 26, 1952 |